United States Patent [19]

Bobeck et al.

[11] 3,832,701

[45] Aug. 27, 1974

[54] TRANSFER CIRCUIT FOR SINGLE WALL DOMAINS

[75] Inventors: Andrew Henry Bobeck, Chatham; Terence John Nelson, New Providence, both of N.J.

[73] Assignee: Bell Telephone Laboratories, Incorporated, Murray Hill, N.J.

[22] Filed: Mar. 28, 1973

[21] Appl. No.: 345,511

[52] U.S. Cl. .................... 340/174 TF, 340/174 BA
[51] Int. Cl. .................... G11c 11/14
[58] Field of Search .................... 340/174 TF

[56] References Cited

UNITED STATES PATENTS 3,723,716 3/1973 Bobeck et al. .................... 340/174 TF

*Primary Examiner*—James W. Moffitt
*Attorney, Agent, or Firm*—H. M. Shapiro

[57] ABSTRACT

Transfer of a single wall domain from one channel to another is achieved by blocking the path of a domain to its next normal position to a manner to create a temporary path along which the blocked domain adjusts its shape for movement to an alternate position to an alternate channel. A pulse on a properly disposed electrical conductor when formed with permalloy produces the desired operation.

4 Claims, 7 Drawing Figures

PATENTED AUG 27 1974

3,832,701

SHEET 3 OF 3

TRANSFER CIRCUIT FOR SINGLE WALL DOMAINS

Field of the Invention

This invention relates to information storage apparatus and more particularly to such apparatus in which information is represented as patterns of single wall domains.

Background of the Invention

U.S. Pat. No. 3,534,347 of A. H. Bobeck issued Oct. 13, 1970 discloses an arrangement for moving single wall domains in a suitable layer of material. A pattern of magnetically soft elements is formed adjacent the layer. The elements have long dimensions in different orientations in the plane of the layer such that a magnetic field reorienting in that plane generates in the elements changing magnetic pole patterns operative to move domains along channels defined by the elements. Typically, the layer is characterized by magnetization in a reference direction along an axis normal to the plane of the layer and a domain has its magnetization antiparallel to that direction. A bias field, normally present during domain movement, is operative to constrict a domain to a preselected diameter. The pole patterns generated by the elements of the magnetic pattern may be thought of as operative to add to and detract from the bias field in accordance with the pattern to define continuously offset field gradients which move the domains. Domain propagation in this manner is commonly termed "field access".

U.S. Pat. No. 3,618,054 of P. I. Bonyhard, U. F. Gianola, and A. J. Perneski issued Nov. 2, 1971 discloses a memory organization ideally suited to field access, single wall domain apparatus. The organization calls for magnetically soft elements to define a number of closed loop channels in which information, in the form of patterns of single wall domains, recirculate in response to reorientations (viz: rotations) of the inplane field. These loops are commonly referred to as "minor" loops and are operative as permanent storage areas. Access to the minor loops is effected by means of a single "major" loop usually oriented perpendicular to the minor loops and coming into a closely spaced relationship with those loops at "transfer positions".

Transfer of information between the major and the minor loops occurs at the transfer positions. Because the usual operation requires transfer of information from the minor loops followed by the return of the information to the minor loops, the transfer arrangement typically is asymmetrical, due to geometric constraints, so that domains moving into a transfer position from different directions are subjected to unlike forces during transfer. Although quite satisfactory transfer margins have been achieved, those margins typically are different depending on whether a domain is being transferred out of or into a minor loop.

Critical to the practical operation of such an arrangement at high speeds is the implementation of a transfer function between the major and the minor loops. Although a variety of different transfer gates operates at speeds in excess of 100 kilohertz planned for first generation bubble memories, the margins exhibited by asymmetrical transfer gates are typically narrower than the margins exhibited by the propagation elements. Consequently, when speeds significantly higher than 100 kilohertz are attempted, failures occur first at these gates.

The failures have been attributed to the asymmetry in the pattern of magnetically soft elements which define the transfer gates. For example, a domain being transferred from a minor loop to the major loop typically "sees" a different overlay arrangement than does a domain moving from the major to a minor loop.

Moreover, a typical asymmetrical transfer requires a pattern of magnetically soft elements as well as an electrical conductor pattern. Such requirements necessitate two-level masking. It is clear, that one-level masking would improve yields and lower costs in the manufacture of such arrangements.

BRIEF DESCRIPTION OF THE INVENTION

In accordance with the present invention, a domain transfer element in a field access arrangement is operative in what might be described functionally as a "blocking mode". The element is defined by magnetic elements of two closely spaced domain channels. The element also includes an electrically conducting path, of magnetically soft material such as permalloy, which lies transverse to the axis of movement of domains in each path. A current impressed in the conductor is operative to stop the movement across the conductor of a domain in the transfer portion of the channel while providing a temporary position to support the domain during transfer. The current is impressed at a time when the next subsequent reorientation of the in-plane (drive) field generates attracting poles in elements to both sides of the conductor sufficiently close to the domain in the transfer portion to be operative upon it. The attracting poles in the transferor channel are on the opposite side of the conductor from that domain and so are inhibited from being operative on it. The poles in the transferee channel, on the other hand, are on the same side of the conductor and are operative to effect transfer. The electrical conductor is made of the same material (permalloy) as the magnetic elements and, when the conductor is pulsed, supplies a favorable environment for a domain during the transfer operation.

DETAILED DESCRIPTION

Figure 1:
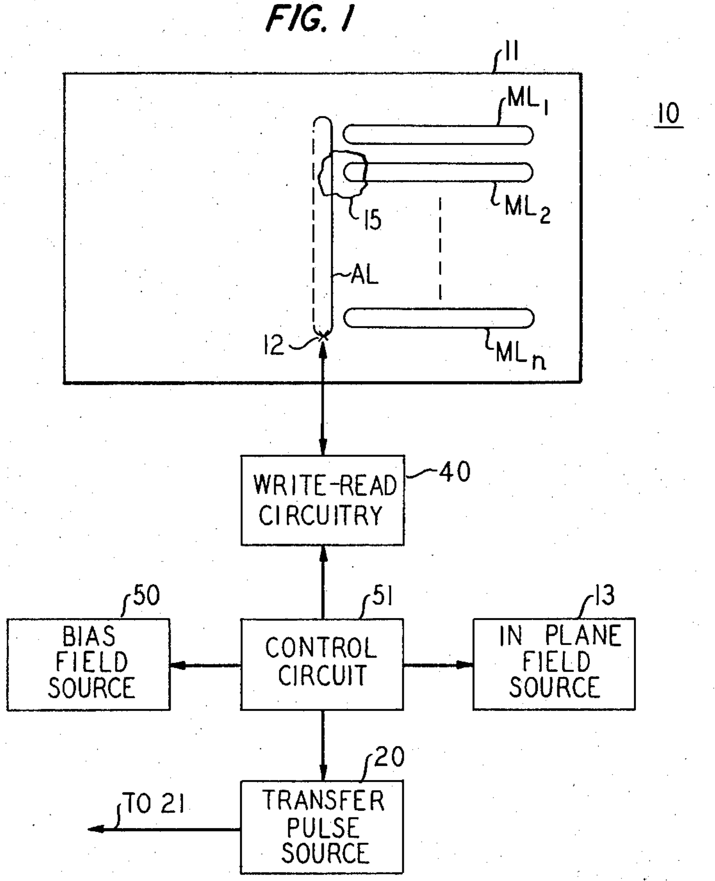
FIG. 1 is a schematic representation of a magnetic memory including a domain transfer in accordance with this invention.

FIG. 1 shows a magnetic, single wall domain memory arrangement 10. The arrangement comprises a layer 11 of material in which single wall domains can be moved. Elements of magnetically soft material couple layer 11 in a manner to define propagation channels or loops for the movement of domains in response to a magnetic field reorienting in the plane of layer 11. The elements are shown illustratively as chevron-shaped in FIG. 2 and indicated in FIG. 1 as closed lines $ML_1$, $ML_2$, . . . $ML_n$ and AL for the minor loops and for the major loop respectively.

The memory 10 is operative to store domain patterns, representative of information, in channels (minor loops) $ML_1$ to $ML_n$ on a permanent basis and to transfer information to an accessing (major) loop AL for movement to a read-write port 12. Movement of information in all loops is synchronous and responsive to the in-plane drive field supplied by a source represented by block 13 of FIG. 1.

Figure 2:
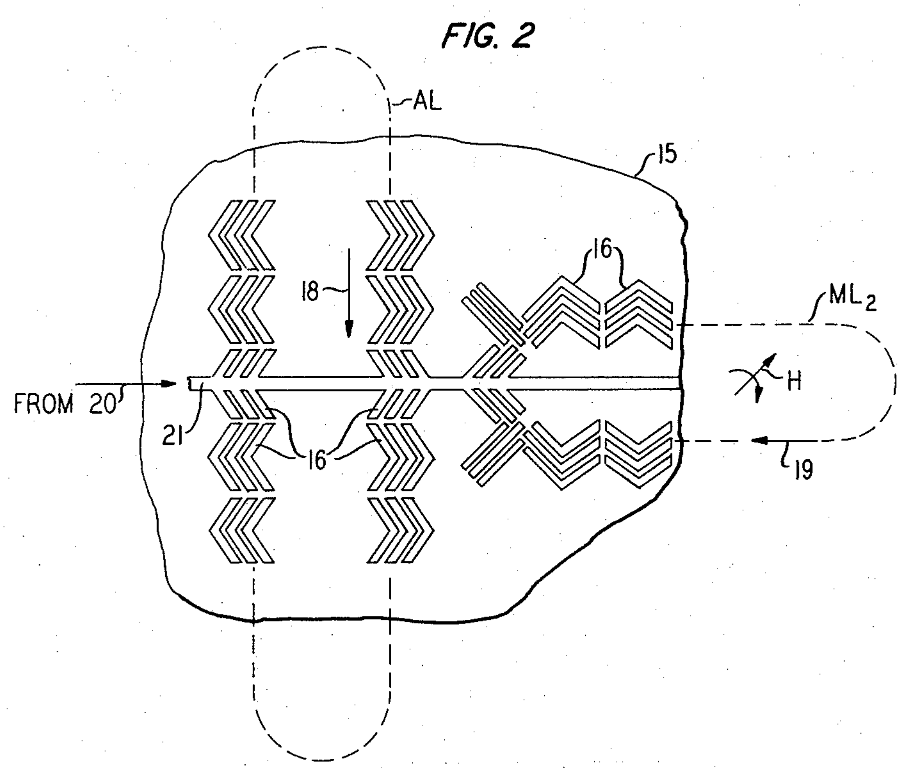
FIGS. 2 through 6 are schematic representations of portions of the arrangement of FIG. 1 showing the magnetic condition thereof during operation.

The transfer of information between the permanent store and the accessing loop occurs at transfer areas where the loops are most closely spaced. A representative transfer area is indicated at 15 in FIG. 1 and shown in detail in FIGS. 2, 3, 4, and 5. Specifically, FIG. 2 shows magnetically soft, chevron-shaped elements 16 which define channels $ML_2$ and AL. Normally, information continues to circulate in each such channel in response to consecutive in-plane field cycles unless transfer to the associated channel occurs.

For a description of the transfer operation, it is assumed that the in-plane field H is rotating clockwise as indicated by the arrow (H) and the associated undesignated curved arrow in FIG. 2. In response, domain patterns move clockwise in each of channels AL and $ML_2$ as indicated by arrows 18 and 19, respectively.

Figure 3:
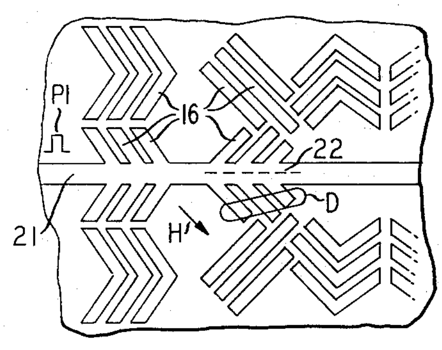

FIG. 3 shows the position of a representative domain D for an orientation of the in-plane field downward and to the right as indicated by arrow H in the figure. At this juncture in the operation, a transfer pulse source represented by block 20 in FIG. 1 applies a pulse P1 to the magnetically soft transfer conductor 21 of FIG. 3. In the preferred embodiment, conductor 21 comprises permalloy and is formed from the same permalloy layer as the chevron pattern. The conductor is shown distinct in the figures because the permalloy conductor can have other conducting material associated with it (as can the entire permalloy pattern) to lower resistance. In this case, insulation from the permalloy pattern is desired.

Figure 4:
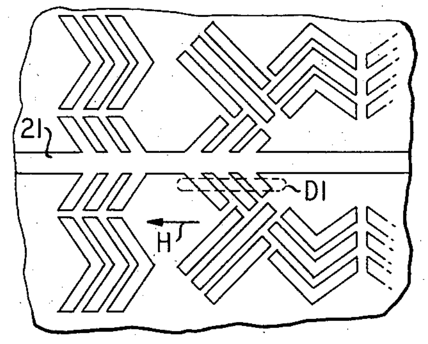

The pulse in conductor 21 is poled to generate a magnetic field which blocks the movement of domain D to the position 22, aligned with the axis of the conductor in FIG. 3, when the in-plane field next rotates to the leftward direction as indicated by arrow H in FIG. 4. Instead, domain D moves to the edge of the conductor and enlarges therealong due to the attractive field generated there by the pulse as well as the poles in conductor 21 due to that field. The domain, slightly enlarged is shown by the broken oval D1 in FIG. 4.

The in-plane field subsequently rotates through an upward orientation and then to the right, the latter orientation being indicated by arrow H in FIG. 5. When the field is in this rightward direction, attractive poles are generated in two locations, 23 and 24, sufficiently close to domain D1 to cause movement of the domain. We will adopt the convention that plus (+) and minus (−) signs indicated attracting and repelling poles in this connection. Domain D1, of course, is unable to move to position 23 because of the blocking field of the pulse in conductor 21. The domain instead is attracted to position 24. It can be seen that transfer of the domain is now accomplished. The pulse in conductor 21 is now terminated, and the transferred information (D) moves downward in channel AL in response to subsequent cycles of the rotating field.

It is also clear from FIG. 4 that negative poles are present to repel domain D1 from the position shown. This condition is not a favorable one for domains and results in decreased margins at high bias fields due to the added "collapse" field supplied by those poles. The permalloy conductor, on the other hand, provides a favorable bubble environment along a path, when pulsed, and the bubble is able to move along that path toward a transference position.

Normal operation of a memory organized as indicated in FIG. 1 requires the transfer of information back into the channel $ML_2$. When such transfer occurs, a domain is being moved into a position 30 in channel AL by the reorientation of the in-plane field again to a direction indicated by arrow H in FIG. 5. The domain in this instance is indicated by broken oval D2 in the figure.

A pulse P2 in conductor 21, operative as described previously, is of a polarity opposite to that applied for transfer to channel AL. Nevertheless, the operation is entirely as described before.

Figure 5:
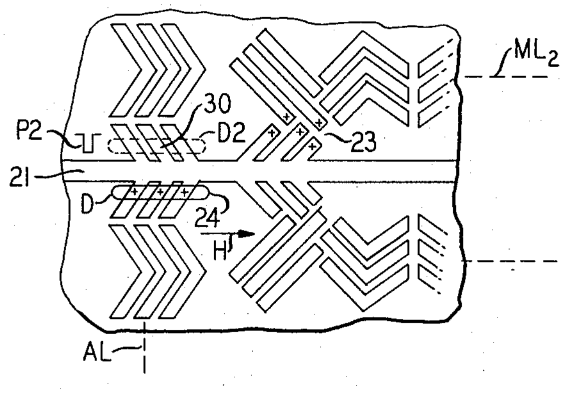

The symmetry of the permalloy pattern resulting in the like operation during this reverse transfer may be appreciated by viewing FIG. 5 upside down. It may be appreciated further that transfer of domains from one channel to another can occur depending only on the polarity and timing of the transfer pulse regardless of the direction from which the transferred domain approaches conductor 21. The inverted geometry of the chevron elements of channels $ML_2$ and AL in FIG. 5 underscored this point. Consequently, a blocking mode transfer of the type described is operative with systems, for example, as indicated in FIG. 1 where access times are reduced by selectively moving domains in either direction in their respective channels to shorten the numbers of bit locations through which information is moved for transfer or for read or write operations.

As is customary in this type of memory, the presence of a domain represents a binary one and the absence of a domain represents a binary zero. Of course, if a domain is absent in FIG. 3, for example, when the transfer pulse occurs, no transfer occurs during the transfer operation.

Figure 6:
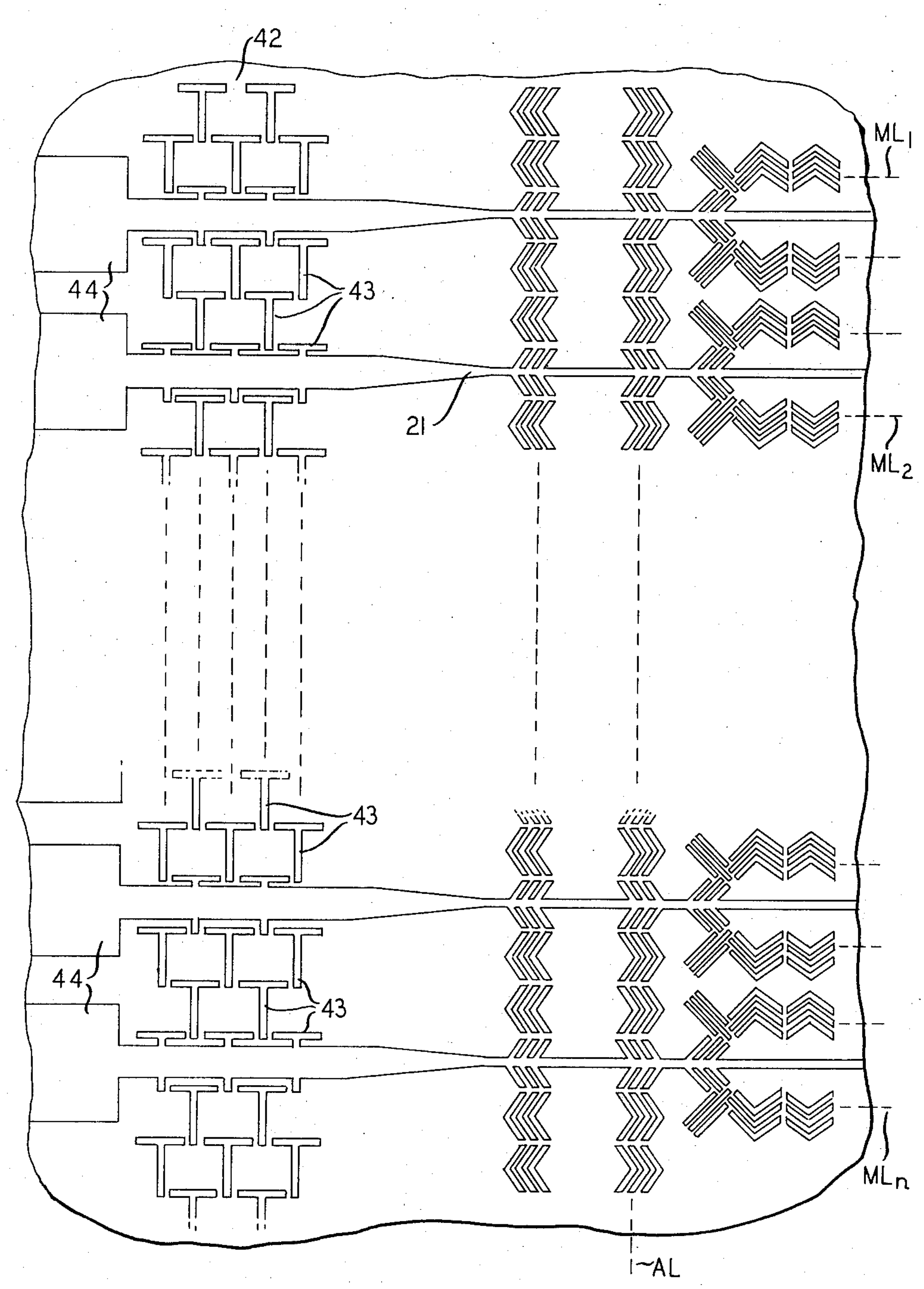

A typical computer generated print for the permalloy pattern is shown in FIG. 6. It should be apparent from an inspection of the print that consecutive transfer operations with respect to channel $ML_2$ results in the transfer of a binary word from that channel into channel AL whereas the parallel pulsing of all conductors 21 results in the transfer of a bit from each channel $ML_i$ to channel AL. Either operation results in the presence of a selected binary word in channel AL for read or for annihilation and rewrite operation prior to restoration of the information from the originating permanent storage channel or channels.

Read-write and annihilate circuitry for operating on information so transferred is well known and an understanding of the operation of such circuitry is unnecessary for an understanding of the present invention. Therefore, the circuitry and its operation are not discussed herein. Suffice it to say that the circuitry is assumed to be present and is represented by block 40 of FIG. 1.

It can be seen in FIG. 6 that conductor 21 widens as it extends through a pattern 42 of T-shaped elements 43 terminating on lands 44 which can be of gold or permalloy. The T-shaped elements constitute a guard rail encompassing the active domain circuit and operative to remove spurious domains.

As mentioned hereinbefore, the elongation of domain D1 along conductor 21 is fostered by the field generated by the pulse in the conductor as well as attracting poles generated by the pulse along the length of the conductor. The field and the poles cause the domain to elongate into a domain-supportive environment and to move to the left as viewed in FIG. 4 along the conductor as the in-plane field reorients. The elongation of a domain along such a conductor is a function of the familiar bias field of a polarity to constrict domains. Regardless of the actual value of the bias field employed, elongation as described does occur. But the extent of the elongation is increasingly smaller for increasingly higher values of bias field. A source of such a bias field is represented by block 50 of FIG. 1.

Surprisingly, high margins are achieved during operation of such a permalloy blocking transfer circuit and the margins are attributed to the presence of a permalloy conductor.

Figure 7:
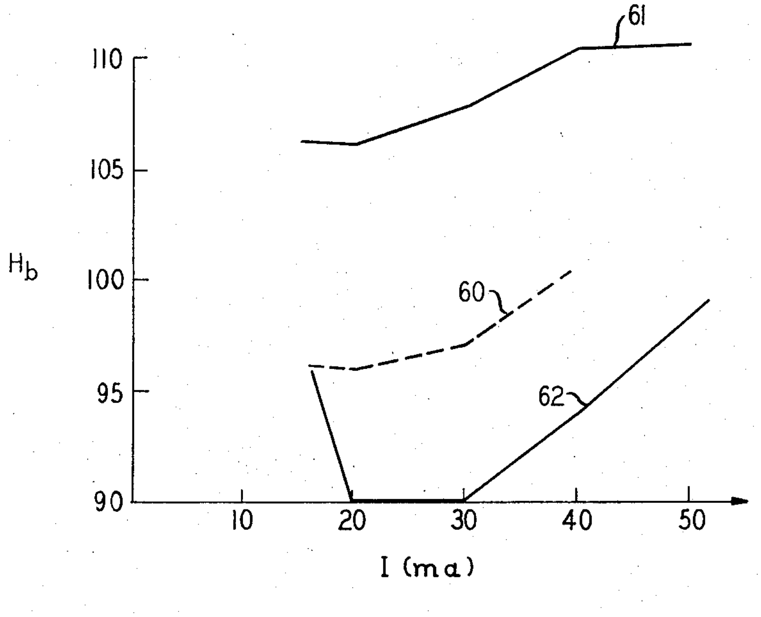
FIG. 7 is a margin plot of a transfer operation in accordance with this invention.

FIG. 7 shows a plot of the margins for the permalloy transfer of FIG. 2. The ordinate is in terms of bias field $H_b$ and the abscissa is in terms of transfer current expressed in milliamperes. It is clear from the figure that a 16 to 18 oersted operating range is achieved over a significant range of transfer currents. The dashed line 60 in the figure indicates a failure by replication for circuits deposited without a spacing layer directly on layer 11. In the absence of a permalloy conductor, the minimum transfer current occurs to the right as viewed in FIG. 7, in an operating region where lines 61 and 62 start to converge.

In one typical circuit in accordance with this invention, a layer of $Y_{2.6}\,Sm_{.4}\,Ga_{1.2}\,Fe_{3.8}0_{12}$ (garnet) 5.3 microns thick was grown on a nonmagnetic substrate of $Gd_3Ga_5O_{12}$ by well-known liquid phase epitaxial techniques. A pattern of permalloy elements, 4000 angstroms thick and about 2 $\mu$m wide (chevron width) on 20 micron centers were formed by photolithographic techniques as shown in part by FIG. 6. Domains having a nominal diameter of 5.3 microns at a bias field of 94 oersteds were moved and transferred in an operating circuit, of the type shown, at a 100 kilohertz rate with an in-plane field of 25 oersteds. Margins were in excess of 10 and 6 oersteds, respectively, for operation above and below line 60 of FIG. 7 at selected test transfer currents.

Wider chevron elements (3.5 microns) and 28 micron period are expected to eliminate the failure mode represented by line 60 of FIG. 7 for permalloy patterns in contact with the bubble material. Alternatively, the permalloy can be separated from the bubble layer by one micron oxide layer to eliminate the failure represented by line 60.

A blocking type transfer gate of the type described herein has also been found particularly attractive in a modification of the memory organization indicated in FIG. 1. In this modified arrangement, a single long channel is convoluted to form a manifold path which constitutes generally the path of a number of small permanent stores as well as a single return path which constitutes the accessing store. Domains in transfer positions of the permanent stores are transferred to corresponding positions of adjacent permanent stores by a sequence of transfer pulses. A judicious orientation of the conductors thus defines the transfer positions of each of the permanent stores as part of the accessing store when transfer pulses are applied. The nontransferred information can be made to recirculate synchronously about individual folds of the arrangement by a parallel transfer arrangement.

What has been described is considered merely illustrative of the principles of this invention. Therefore, various embodiments can be devised by those skilled in the art in accordance with those principles within the spirit and scope of this invention as encompassed by the following claims.

What is claimed is:

1. Magnetic apparatus comprising a layer of material in which single wall domains can be moved, a pattern of elements coupled to said layer for defining first and second channels for the movement of domains in opposite directions respectively therealong in response to a magnetic field reorienting in the plane of said layer, first and second ones of those elements in said first and second channels respectively being closely spaced at a transfer position, an electrical conductor of magnetically soft material coupled to said layer and extending between said first and second channels at said transfer position at locations between first and second normal successive domain positions with respect to each of said first and second elements, said conductor when pulsed being operative to block the movement of a domain from a first to the associated second position of said first element and to provide a supportive environment for a domain between said first position of said first element and the second position of said second element as said in-plane field reorients to a direction for moving domains from said first to said second positions.

2. Apparatus in accordance with claim 1 wherein said elements and said conductors comprise permalloy.

3. Apparatus in accordance with claim 2 wherein said elements of said first and second channels are chevron shaped and said first and second elements have geometries inverted from one another.

4. Magnetic apparatus comprising a layer of material in which single wall domains can be moved, a pattern of elements coupled to said layer for defining first and second channels for the movement of domains in opposite directions respectively therealong in response to a magnetic field reorienting in the plane of said layer, first and second ones of those elements in said first and second channels respectively being closely spaced at a transfer position, an electrical conductor extending between said first and second channels at said transfer position at locations between first and second normal domain positions with respect to each of said first and second elements, said conductor when pulsed being operative to block the movement of a domain from a first to the associated second position of said first element and to provide a supportive environment for a domain between said first position of said first element and the second position of said second element as said in-plane field reorients to a direction for moving domains from said first to said second positions.

* * * * *